United States Patent
Preikschat

[11] 3,821,900
[45] July 2, 1974

[54] PROPORTIONAL BIN LEVEL SENSOR

[76] Inventor: Fritz K. Preikschat, 16020 Lake Hills Blvd., Bellevue, Wash. 98004

[22] Filed: Oct. 18, 1971

[21] Appl. No.: 190,169

Related U.S. Application Data

[62] Division of Ser. No. 54,286, July 13, 1970, Pat. No. 3,653,543.

[52] U.S. Cl. .............................. 73/304 C, 137/392
[51] Int. Cl. ........................................... G01f 23/26
[58] Field of Search ........ 73/304 R, 304 C; 137/392

[56] References Cited
UNITED STATES PATENTS

| | | | |
|---|---|---|---|
| 3,119,267 | 1/1964 | Bartky | 73/304 C |
| 3,135,916 | 6/1964 | Tannenbaum et al. | 73/304 C X |
| 3,375,716 | 4/1968 | Hersch | 73/304 C |
| 3,543,046 | 11/1970 | Tiffany | 73/304 C X |
| 3,602,251 | 8/1971 | Hill | 137/392 |
| 3,671,142 | 6/1972 | Calabrese | 137/392 X |

Primary Examiner—Richard C. Queisser
Assistant Examiner—Frederick Shoon
Attorney, Agent, or Firm—Christensen, O'Connor, Garrison & Havelka

[57] ABSTRACT

A system for providing a proportional and continuous signal indicative of the level of a product within a bin includes a capacitive sensor which provides an output signal which is proportionally related to the actual level of the product within the bin. The sensor comprises a metallic rod and provides its output signal by determining the complex impedance existing between the rod and the bin wall, wherein the rod is partially immersed in the product.

5 Claims, 4 Drawing Figures

3,821,900

PROPORTIONAL BIN LEVEL SENSOR

CROSS-REFERENCE TO RELATED APPLICATION

This application is a division of a copending application entitled "Proportional Bin Level and Flow Control System," Preikschat, Ser. No. 54,286, filed July 13, 1970, now U.S. Pat. No. 3,653,543, granted Apr. 4, 1972.

BACKGROUND OF THE INVENTION

This invention generally relates to process control systems, and more particularly, to a sensor useful in such systems for providing an output signal proportional to the level of a product within a metallic bin.

Certain types of processes common in the food and water treatment industries, for example, have long time constants in which the product being treated or formed by the process moves slowly but continuously through the process steps, or in which the product is treated or formed in each step for a relatively long period of time.

Industrial processes of this type and others are described in more detail in a co-pending application entitled INDUSTRIAL PROCESS CONTROL DEVICE CONTROLLING OPERATIONS WITH LONG TIME CONSTANTS, by Fritz K. Preikschat, now U.S. Pat. No. 3,628,116. In that application, an improved control system is described and claimed for providing proportional control by means of a process control parameter in response to a measurement of a process variable.

The teachings of U.S. Pat. No. 3,628,116 are relevant to a consideration of the present invention and therefore the details thereof are fully incorporated by reference into this application In addition, specific references will be made to U.S. Pat. No. 3,628,116 at points throughout the remainder of this specification.

The invention described and claimed in copending application Ser. No. 54,286, entitled PROPORTIONAL BIN LEVEL AND FLOW CONTROL SYSTEM, by Fritz K. Preikschat, deals with adaptations of the system described in U.S. Pat. No. 3,628,116 to industrial processes which involve the transfer of a product into and out of a storage bin or tank. Although that invention will be hereinafter described in terms of an industrial process for a flour mill in which the product comprises wheat, it also finds applicability in other processes of the food, water treatment, and other similar industries.

In the case of certain processes useful in producing flour, it is desirable to store wheat within a bin for a relatively long period of time, that is, on the order of 10 to 30 minutes, during which time the wheat either absorbs additives, such as water, or is simply held in order for a simultaneous process step to be completed on another product. In such cases it is desirable to uniformly transfer the wheat to or from the bin. In the interest of process economy, it is imperative that this transfer be done on a continuous basis so that the entire process can be operated continuously, that is, material is constantly flowing through the process steps so that a continuous flow of end products is obtained.

In the example discussed, it is desirable to keep the level of wheat in the bin within a predetermined range. It will be shown hereinafter that the level of the product can be kept within the predetermined range or at a predetermined value by controlling the flow rate of discharge to or from the bin.

However, if the bin is to be used in a continuous process as described above, the discharge of material must likewise be continuous. In addition, any change in the rate of discharge must be controlled within desired limits if a truly continuous process is to be achieved. For example, some of the prior art devices for bin control have sensed either an extreme high or an extreme low level of product and provided in response thereto one of two output signals which would be supplied to appropriate means controlling the discharge of material from the bin. With these devices, the bin level control is provided only upon an extreme limit of product, so that the discharge therefrom is in large, discontinuous amounts. With similar devices, bin level control is provided for intermediate levels of product so that the discharge of product from the bin is in discrete steps providing a "step-wise" proportional bin level control. In both of these situations, changes in the rate of discharge are discontinuous and unacceptable for use in continuous processes.

Since "on-off" bin level devices of these types are inappropriate for use in continuous processes, their use predominantly has been limited to alarm circuitry in which immediate process shut down or other emergency, corrective measures are indicated. In continuous processes involving a long time period of product storage or presence within a bin, it has long been the practice for the bin level and flow rate of discharge to or from the bin to be controlled by human operators. This expedient is definitely not economical at present. In addition, it reduces the likelihood of using a bin storage system with a process requiring a relatively high process flow rate for its implementation.

It is therefore an object of this invention to provide a sensor means which furnishes an output signal which is proportional to the level of a product within a metallic bin.

It is a further object of this invention to provide such a sensor means suitable for use in the measurement of the level of hot, sticky products within the bin.

It is yet a further object of this invention to provide such a sensor means which provides a continuous output signal to allow continuous control of the level of the product within the bin.

SUMMARY OF THE INVENTION

Briefly, these and other objects are achieved in one embodiment of the invention by providing a conductive rod which is supported from and insulated from the metallic bin, a pulse generating means providing a high-frequency, square-wave output, first and second controllable semiconductors having their main current-carrying terminals connected in series between a supply terminal of a voltage source and an output terminal, the conductive rod being coupled to the common junction of the main terminals of the semiconductors and means coupling the square-wave output of a pulse generating means to control terminals of the semiconductors, whereby the conductive rod is first charged through the first semiconductor, and then discharged through the second semiconductor to produce a proportional output signal on said output terminal.

BRIEF DESCRIPTION OF THE DRAWINGS

The invention is particularly pointed out and distinctly claimed in the concluding portion of this specification. For a complete understanding thereof, together with further objects and advantages, reference should be made to the following portion of the specification taken in conjunction with the accompanying drawings in which:

DESCRIPTION OF A PREFERRED EMBODIMENT

Figure 1:
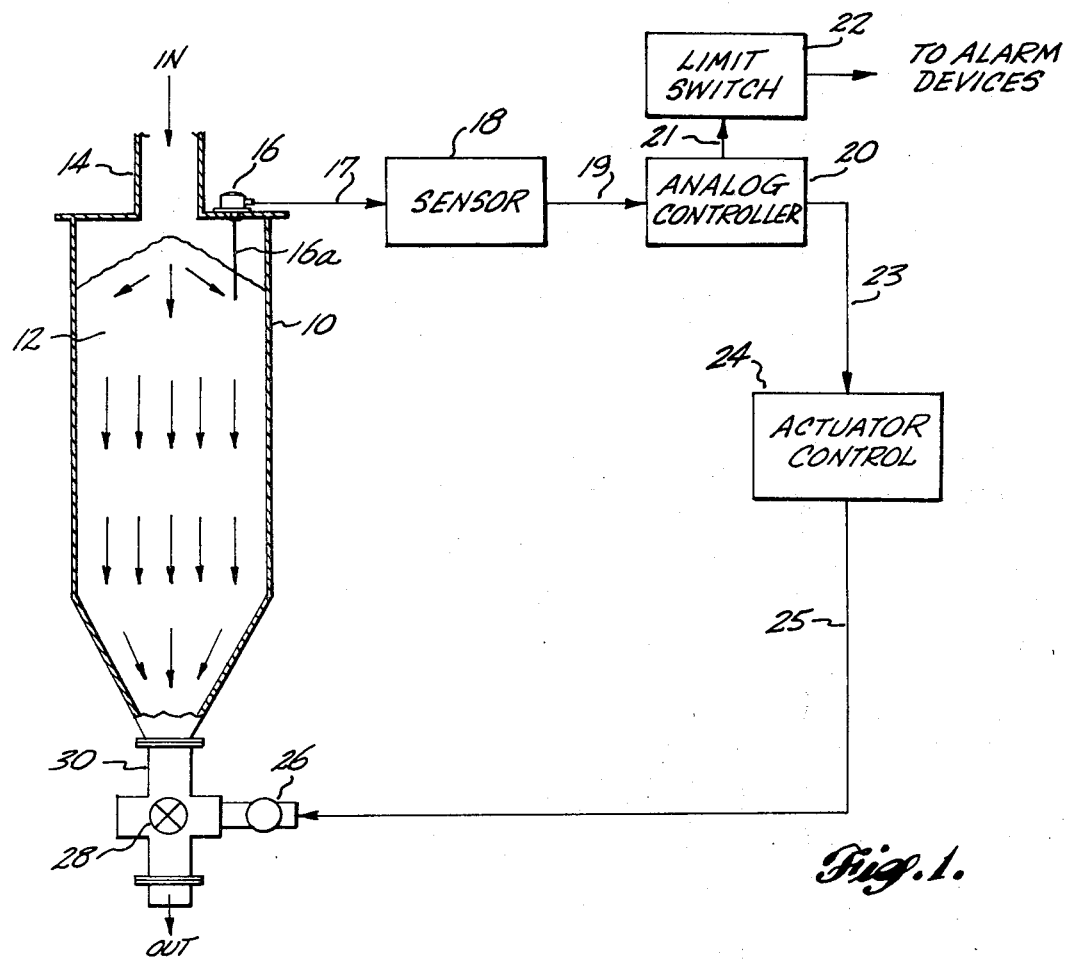
FIG. 1 is a block diagram of the a bin level and flow control system.

With particular reference to FIG. 1, a bin or tank 10 forms one link of an industrial process and provides a means for temporary storage of a product 12 therein. The product 12 may comprise particulate material, such as wheat and other grains, cement, powders, and the like, or a liquid, such as a solution or slurry of solid products, or a chemical constituent in the process. The product 12 is placed in the bin 10 through an entrance opening 14 which preferably is coupled to another device used in the process. The device may be a conveyor, a flow controlling valve, or the like, so that the product 12 is placed in the bin continuously, or at fairly regular intervals.

In industrial processes of the type under consideration, the product 12 is stored in the bin 10 for a relatively long period of time, that is, on the order of 10 to 30 minutes. For example, if the product comprises wheat, and the industrial process has as an end product thereof flour, the wheat may be taken from a first storage bin, passed through a moistening process wherein a continuous flow of water is added to the continuous flow of wheat, and then placed in a second storage bin, such as bin 10 of FIG. 1, for a perscribed length of time so that the wheat can absorb the surface water before it is passed on to the next step of the process.

In such a process the system to be described may be used for controlling the operation of both the first and second bins. In the first example, the wheat is added to the bin by dumping so that the wheat level therein varies in distinct, irregular stops. However, flow of wheat from the bin must be uniform and continuous, and therefore the control system must compensate for such irregular changes in bin level to provide a continuous and uniform flow rate of discharge therefrom.

The second bin may be filled continuously, but also must be emptied continuously if a truly continuous process is to be achieved. In this example also, the control system must assure a smooth and steady flow rate of discharge of the wheat to or from the bin to a device embodying the next process step.

To ensure such continuous operation, the system described and claimed in copending patent application U.S. Ser. No. 54,286 provides a first signal which is directly proportional to the level of the product 12 within bin 10, and operates on that first signal by suitable analog circuitry to obtain a second signal which represents a desired control actuation for a device regulating the flow rate of discharge to or from bin 10. In the case where the flow rate of discharge from the bin is to be controlled, the second signal embodies time constants which approximate the long time constants involved in the work function of the bin. The term "work function" describes the controlling parameter of the process, or flow rate, in terms of the measured parameter of the process, or bin level. This relation, as described in more detail hereinafter, includes the control function needed to control bin level and also includes any variations on or additions to that function which arise from the particular process being controlled. If the controlling flow rate is that of product discharge into the bin, the work function differs from that when the controlling flow rate is that of product discharge from the bin.

The term "time constant" describes the time required, given a particular work function, for changes in the controlling flow rate to be reflected in changes in the bin level.

More specifically, an electrode assembly 16 is disposed on bin 10 and includes an elongated metallic rod 16a which extends into the interior of bin 10. As will be seen hereinafter, electrode assembly 16 is insulated by suitable means from the metallic bin 10. In addition, rod 16a extends into bin 10 for a distance sufficient to insure contact thereof with the product 12 during anticipated normal conditions of operation.

An output signal obtained from electrode assembly 16 is therefore proportional to the impedance between rod 16a and the metallic bin 10, which is preferably maintained at ground potential. This signal is supplied via a line 17 to a sensor circuit 18 which converts this output signal into a signal on line 19 which is directly proportional to the level of the product 12 in bin 10. To this end, sensor 18 includes circuits controlling the measurement of the impedance between rod 16a and bin 10 and the corresponding production of an output signal from electrode assembly 16, and circuits linearizing this output signal so that a true proportional indication is obtained.

The proportional signal on line 19 is supplied to an analog controller 20 which functions to provide stable control of bin level at a continuous flow rate of discharge therefrom by including means approximating the work function and accompanying time constants of the bin 10 in the process step involved. To this end, analog controller 20 compares the proportional level signal on line 19 with a reference, if desired, and then converts any undesirable deviation from that reference into a suitable control signal supplied on a line 23 to an actuator control 24 for the control device of this invention. Analog controller 20 also supplies an output signal on line 21 to a limit switch circuit 22 which functions to detect undesirable extreme maximum and minimum bin levels. The signal on line 21 may be directly proportional to bin level, and thus correspond to the signal on line 19, or may be representative of the deviation of the bin level from a desired reference. In either case, limit switch circuit 22 supplies an output signal to an alarm device, not shown, when either the maximum or the minimum bin level condition occurs. The alarm device may comprise a warning mechanism, a shut down device for the input and output feeding mechanisms associated with bin 10, or the like.

The actuator control circuit 24 supplies an appropriate control signal on a line 25 to actuator 26. In turn, actuator 26 controls the position of a control device 28 which is disposed in an exit 30 from bin 10. As will be explained in more detail hereinafter, flow control device 28 is preferably of the pinch valve type in which means are provided to vary the cross-sectional area of a collapsible tube, and accordingly actuator 26 converts the signal from actuator control 24 into an appropriate mechanical movement for the area or flow controlling means of device 28. The circuitry within actuator control 24 must be chosen to accommodate the time constants and operational requirements of both the actuator 26 and the flow control device 28. The actuator control 24 and actuator 26 preferably comprise an electric drive system which is designed to provide a slowly-changing mechanical movement at the output of actuator 26 in response to the slowly-changing control signal from analog controller 20. Alternatively, actuator 26 could comprise a motor drive for a variable speed conveying mechanism whose speed is varied in proportion to the control signal from analog controller 20, a hydraulic valve actuator, or the like.

A detailed discussion of analog controller 20 and actuator control 24 can be found in the aforementioned U.S. Pat. No. 3,628,116.

Figure 2:
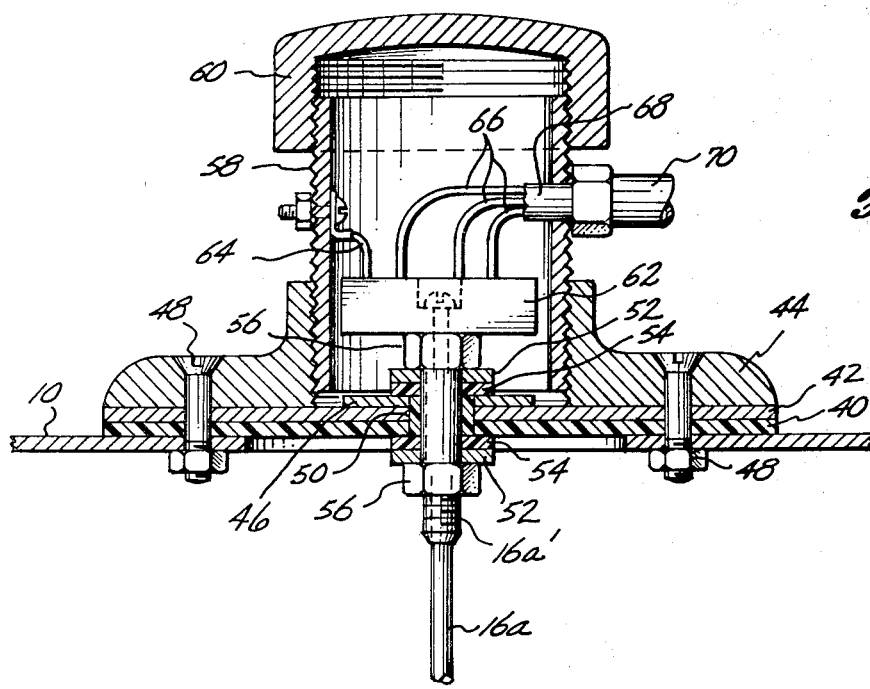
FIG. 2 is a cut-away pictorial view of a portion of the bin level sensor illustrated in FIG. 1.

The invention can perhaps best be understood by reference to specific embodiments of the system elements. With reference now to the electrode assembly construction of FIG. 2, the metallic rod 16a includes an enlarged, threaded portion 16a' which is affixed to the electrode assembly 16. Specifically, an aperture is cut in the top of bin 10 and the electrode assembly 16 and rod 16a are inserted therein. An insulating plate 40 covers the aperture in the top of bin 10 and preferably comprises Teflon or other plastic material which inhibits the formation of deposits of the product 12 upon its surface. A stainless steel plate 42 is coextensive with insulating plate 40 and supports a housing 44 and an electrode support plate 46 on its upper surface. The combination of plates 40 and 42 and housing 44 is secured to the bin 10 by a plurality of suitable fastening means 48 which additionally serve to electrically connect housing 44 to bin 10 so that both are at the same electrical potential.

A central aperture is provided in plates 40, 42 and 46 to permit passage of the portion 16a' of rod 16a therethrough. An insulating spacer 50 surrounds portion 16a' throughout the extent of the aperture in plates 40, 42 and 46. In addition, portion 16a' is secured to this plate assembly by inner insulating washers 54 outer stainless steel washers 54, and nuts 56 which are threaded onto portions 16a' to compress the washer and plate assembly. As with plate 40, spacer 50 and washers 54 are preferably of Teflon so that the interior of housing 44 is sealed from the interior of bin 10. In the cooking of bulgur wheat, for example, the wheat within bin 10 is hot and moist so that residues tend to form on the inner surfaces of the bin. Without the use of a sealing and insulating material such as Teflon, these residues would in time coat both the aperture in bin 10 through which the electrode assembly 16 protrudes and the sensitive electronic components hereinafter to be described within the interior of housing 44.

If desired, housing 44 may be secured to steel plate 42 by an epoxy cement or the like to further increase the rigidity of the electrode assembly 16.

A threaded portion 58 and a cap portion 60 complete the housing for the electrode assembly 16 and, together with housing portion 44, define a chamber in which some or all of the circuitry within sensor 18 is disposed. Specifically, a circuit board 62 is secured to the top of rod 16a by a suitable fastening means and has disposed thereon a plurality of electronic components, preferably configured as illustrated in the schematic diagram of FIG. 3A. The circuit board 62 may be potted in a suitable moistureproof compound and a plurality of leads provided therefrom for appropriate connection to the remainder of the system. A lead 64 is attached directly to housing portion 58 which is, as previously discussed, at ground potential, and a plurality of leads 66 are passed through a suitable fitting 68 into a conduit 70 for connection to analog controller 20.

Experiments with electrodes of this type indicate that in spite of a hot, humid, dirty and corrosive environment within the interior of bin 10, a relatively high leakage impedance, on the order of 20 megohms, can be maintained between rod 16a and the surrounding portions of bin 10. In those experiments, the rod 16a comprised a 4 feet long, quarter-inch diameter, stainless steel bar. As the sensor circuits hereinafter to be described measure the level of the product 12 in bin 10 by determining the complex impedance between rod 16a and bin 10, a simple metallic rod can be used for relatively or moderate dry particulate material. However, if the product 12 is very moist or a liquid, in which case the resistance between rod 16a to bin 10 is very low, it is desirable to measure only the distributed capacitance therebetween and in such cases the stainless steel rod 16a may be covered with a plastic insulating tube, such as Teflon.

Figure 3A:
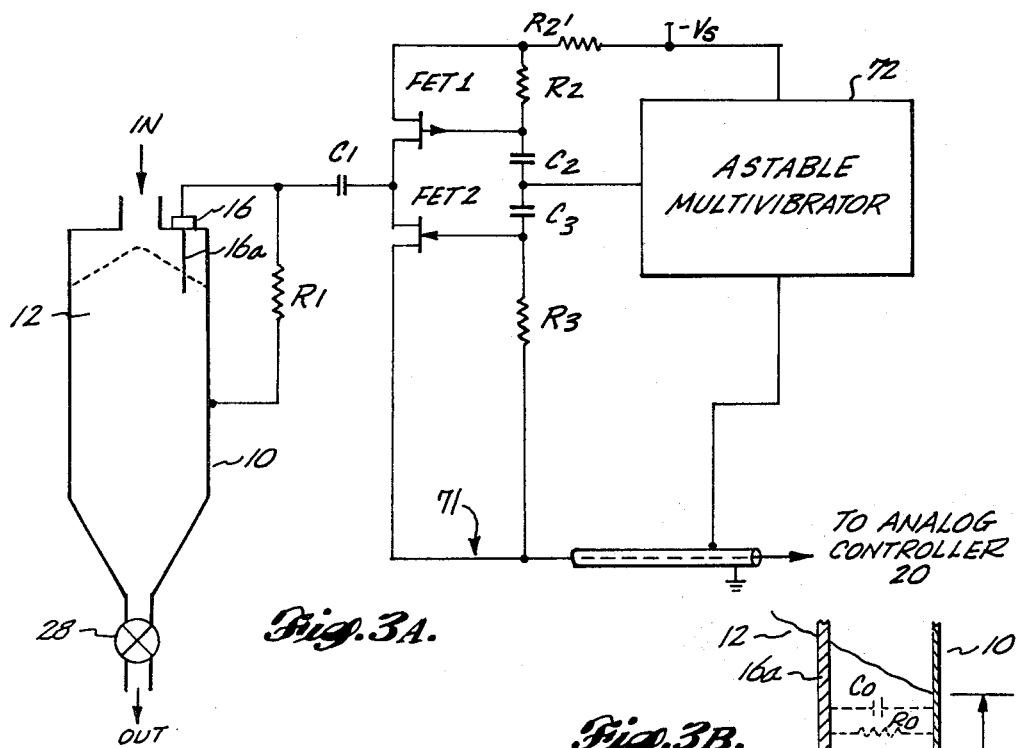
FIG. 3A is a schematic diagram showing the electrical components of the sensor of FIG. 1.
Figure 3B:
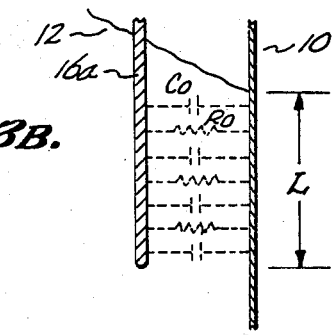
FIG. 3B is a pictorial view illustrating the operation of the sensor.

Referring now to FIGS. 3A and 3B, the sensor 18 provides an output signal which is proportional to bin level by measuring the complex impedance between the electrode rod 16a and the adjacent bin 10. With particular reference to FIG. 3B, this impedance may be visualized as comprising a plurality of distributed capacitances $C_o$ and a plurality of distributed resistances $R_o$. When the rod 16a is immersed in the product 12, the total resistance between rod 16a and bin 10 can be expressed as $R_r = R_o/L$ where $R_o$ is the resistance per unit length of rod and L is the length of rod that is immersed in the product. As seen in FIG. 3B, the resistance $R_r$ results from the plurality of resistances $R_o$ which are effectively connected in parallel. It has been found that for moist wheat, the resistance $R_r$ for a length of immersion L equal to one inch is about 10 kilohms. 12 inches of immersion produces an $R_r$ equal to 840 ohms.

The complex impedance resulting from the plurality of capacitances $C_o$ also decreases with increasing product level and increase in length of immersion L. The total capacitance between rod 16a and bin 10 may be expressed as $C_r = C_o \cdot L$, where $C_o$ is the capacitance per unit length of the rod and L is again the length of the rod immersed in the product. It has been found that for moist wheat the capacitance $C_r$ varies from 20 picofarads for L equal to zero to 70 picofarads for L equal to 3 feet.

In FIG. 3A, the electrode rod 16a is coupled to the common junction of a capacitor C1 and a resistor R1. Resistor R1 is connected in parallel with the impedance between rod 16a and bin 10 and capacitor C1 is in turn connected to the common junction of two field effect transistors FET1 and FET2. Each of these devices, as it is well known, has a gate electrode, a drain electrode, and a source electrode. In the embodiment illustrated, the source electrode of FET1 is connected to the drain electrode of FET2. The drain electrode of FET1 is connected to a negative voltage supply $-V_s$ and the source electrode of FET2 is connected to an output lead 71.

When a field effect transistor is in a non-conducting state, the input impedance between its drain and source electrodes is very high, on the order of hundreds of megohms. Thus, the field effect transistor is desirable for the measurement of small complex impedances.

FET1 and FET2 are alternately switched at a desired frequency $f$ by an astable multivibrator 72 which is connected to $-V_s$ and to ground potential and which provides a relatively square wave output signal which is coupled to the gate electrodes of FET1 and FET2 through an input network comprising capacitors C2 and C3, respectively. A resistor R2 is connected between the gate to the drain electrodes of FET1 and a resistor R3 is connected between the gate to the source electrodes of FET2. A resistor R2' connects the supply $-V_s$ to R2. Finally, the lead 71 is connected to the central conductor of a coaxial cable 73 and the shield thereof is connected to ground potential.

In operation, astable multivibrator 72 first energizes FET1 to apply a given voltage across the series connection of capacitor C1 and the capacitance $C_x$ between rod 16a and bin 10. Accordingly, the series capacitance is charged to a given value. Then, FET2 is energized by astable multivibrator 72 to provide a discharge path to line 71. If the capacitance of C1 is much larger than the anticipated capacitance $C_x$, so that the complex impedance thereof is much smaller, the discharge current appearing on line 71 is inversely proportional to the change in complex impedance and thus directly proportional to the change in depth of submersion L.

Resistor R1 should be chosen to have a relatively large value so as to not affect the measurement of impedance while preventing the buildup of static charges on the electrode rod 16a and the bin 10. In order to obtain adequate current levels from the small capacitances involved, the switching frequency $f$ of astable multivibrator 72 should be relatively high. For a capacitance $C_x$ of approximately 100 pf, maximum, a frequency $f$ of 1 MHz produces an output current in the range of 0.5 to 2.0 ma. The multivibrator 72 may be any conventional type which can provide a relatively square wave signal having a frequency of this magnitude.

A working model of the electrode assembly 16 and sensor 18 was constructed in which the component types and values were as in Table I.

TABLE I

| Component | Type and Value |
|---|---|
| R1 | 1 M |
| R2 | 10 M |
| R2' | 1 KΩ |
| R3 | 10 M |
| C1 | 1000 pf, 1KV |
| C2 | 1000 pf, 1KV |
| C3 | 1000 pf, 1KV |
| FET1 | 2N5462 |
| FET2 | 2N5485 |
| $-V_s$ | $-10$ v |

The signal thus appearing on the central conductor of the coaxial cable represents the aforementioned first signal or output from sensor 18 and is proportional to bin level. This first signal is supplied to analog controller 20.

While this invention has been described in terms of preferred embodiments of the electrode 16 and sensor 18, it is to be clearly understood by those skilled in the art that the invention in its broadest aspects is not limited thereto, but rather is intended to be bounded by the limits of the appended claims.

What is claimed is:

1. A sensor for providing an output signal which is proportional to the level of a solid or a semi-solid product contained within a metallic bin, comprising:
    a. a conductive rod,
    b. means supporting said conductive rod within the bin and electrically insulated therefrom, said rod being thereby partially immersed in said product,
    c. pulse generating means producing a high-frequency, square-wave output,
    d. first and second controllable semiconductors, each having a pair of main, current-carrying terminals and a control terminal and normally exhibiting a relatively high impedance between said main terminals when in a nonconducting state and exhibiting a relatively low impedance therebetween when a control signal is applied to said control terminal,
    e. an output terminal and a voltage source,
    f. means providing a conductive path between said bin and one side of said voltage source,
    g. means connecting said pairs of main terminals in series between said voltage source and said output terminal and providing a common junction between said first and said second controllable semiconductors,
    h. means coupling the square-wave output of said pulse generating means to both said control terminals so as to alternately apply a control signal to each control terminal of said semiconductors, and
    i. means coupling said conductive rod to said common junction,
    j. whereby said rod is first charged through said first controllable semiconductor from said voltage source and then discharged through said second controllable semiconductor to said output terminal at a rate determined by the square-wave output to thereby produce said output signal on said output terminal.

2. A sensor as recited in claim 1, wherein said pulse generating means comprises an astable multivibrator, and said first and second rollable semiconductors comprise field effect transistors.

3. A sensor as recited in claim 1, further comprising insulating means covering said conductive rod.

4. A sensor as recited in claim 1, wherein the bin defines an aperture therein and said supporting means comprises:
    a. an insulating plate of plastic material covering the bin aperture,
    b. a metallic plate coextensive with and supported by said insulating plate, both of said plates defining central, aligned apertures therethrough,
    c. an insulating means clamped about both of said plates and extending through said central, aligned apertures to support said conductive rod therein, d. a closed housing supported by said metallic plate, and e. fastening means securing said housing, said metallic plate and said insulating plate to the bin.

5. A sensor as recited in claim 4:

a. wherein said conductive rod extends into said housing, and b. further comprising a circuit board supported on said rod within said housing.

* * * * *